United States Patent [19]

Biedka

[11] Patent Number: 4,548,630

[45] Date of Patent: Oct. 22, 1985

[54] FIBRE FUSION SPLICING

[75] Inventor: Ryszard Biedka, Leeds, England

[73] Assignee: ITT Industries, Inc., New York, N.Y.

[21] Appl. No.: 679,106

[22] Filed: Dec. 7, 1984

Related U.S. Application Data

[63] Continuation of Ser. No. 467,534, Feb. 17, 1983, abandoned.

[30] Foreign Application Priority Data

Feb. 17, 1982 [GB] United Kingdom ................. 8204678

[51] Int. Cl.$^4$ ............................................. C03B 29/00
[52] U.S. Cl. ........................................... 65/2; 65/4.2; 65/4.21; 65/36; 156/158; 350/96.21
[58] Field of Search ........................ 65/4.2, 4.21, 2, 36; 156/158; 29/464, 466; 350/96.21

[56] References Cited

U.S. PATENT DOCUMENTS 4,152,190  5/1979  Kurosawa et al. ............... 65/4.21 X
4,248,499  2/1981  Liertz et al. ....................... 350/96.21
4,274,707  6/1981  Pacy et al. ......................... 65/4.21 X
4,313,744  2/1982  Toda ..................................... 65/4.21

OTHER PUBLICATIONS

End Preparation and Fusion Splicing of an Optical Array with CO$_2$ Laser, Appl. Optics, vol. 18, #19, 10/1/1979, Kinoshita et al., pp. 3256-3260.
Arc Fusion Splice of Single-Mode Fibers: A Practical Splice Machine, Applied Optics, vol. 21, #11, 6/1/1982, Kato, pp. 1916-1921.

Primary Examiner—Robert Lindsay
Attorney, Agent, or Firm—John T. O'Halloran; Robert P. Seitter

[57] ABSTRACT

A method and apparatus for fusion splicing optical fibres, in which the first clamping arrangement comprising arms 3 and 4 and clamps 3a, 4a pivots over from a first position to a second position in which magnetic fibre clamps 14a, 14b hold the fibre ends in a two-part fibre V-location 8a, 8b to precisely coaxially align the fibre ends. Fusion electrodes 11, 12 fuse the ends together.

4 Claims, 3 Drawing Figures

FIBRE FUSION SPLICING

This application is a continuation of application Ser. No. 467,534, filed Feb. 17, 1983, now abandoned.

The present invention relates to a fibre fusion splicing apparatus for splicing the free ends of two resilient fibres, and to the method involved.

BACKGROUND OF THE INVENTION

Optical dielectric fibres are becoming widely used for transmitting signals. The fibres, which are normally of a glass material, are very fine and it is conventional to join the two fibres end to end by fusion techniques. This requires very accurate alignment of the free ends of the two fibres to be joined and this has created some problems.

SUMMARY OF THE INVENTION

According to the present invention there is provided a method of joining the ends of two optical fibres comprising clamping the fibres in a first clamping arrangement so that the ends to be joined are facing each other, and then clamping the fibres in a second clamping arrangement which precisely locates the ends on a common axis, and joining the ends together by fusing the ends.

According to a second aspect there is provided an apparatus for joining the ends of two optical fibres comprising a first clamping arrangement for clamping the two fibres so that the ends to be joined are facing each other, and a second clamping arrangement for clamping the ends of the fibres to precisely locate the ends on a common axis, and fusion means for fusing the ends together.

The second clamping arrangement is adjacent the free ends of the fibres such that the bared ends remain in accurate coaxial alignment with one another. Preferably there is a fine pitch adjusting screw to axially adjust at least one of the fibres so that they touch each other in the splicing process and are correctly positioned relative to fusion electrodes.

In preferred arrangement, the notch is provided by two members providing respective flat surfaces at an angle of 90° which provides a sharp longitudinal notch. The two members may comprise two common blocks mounted to one another, the blocks having machined faces. By utilizing two blocks to produce each member each of the faces may be machined right up to what, in the assembled member, provides the longitudinal notch so that a very accurate notch can be provided.

So that the two members can be exactly identical, they are preferably manufactured in one piece and then cut.

According to an other aspect of the invention there is provided a method of joining the ends of two optical fibres comprising locating the ends to be joined in respective coaxial grooves, holding the ends in the grooves by a magnetically biassed holding device, and fusing the ends together.

According to yet another aspect of the present invention there is provided apparatus for joining the ends of two optical fibres comprising support means defining coaxial grooves, a magnetically biassed holding device for holding the ends of the two optical fibres to be joined in respective ones of the grooves, and fusing means for fusing the two ends together.

Preferably rubberized magnetic pads are used in the second clamping arrangement or holding device so no undue pressure is applied by the clamping members to the fibres.

BRIEF DESCRIPTION OF THE DRAWINGS

A preferred embodiment of the invention will now be described by way of example only and with reference to the accompanying drawings in which.

DESCRIPTION OF THE PREFERRED EMBODIMENT

Figure 1:
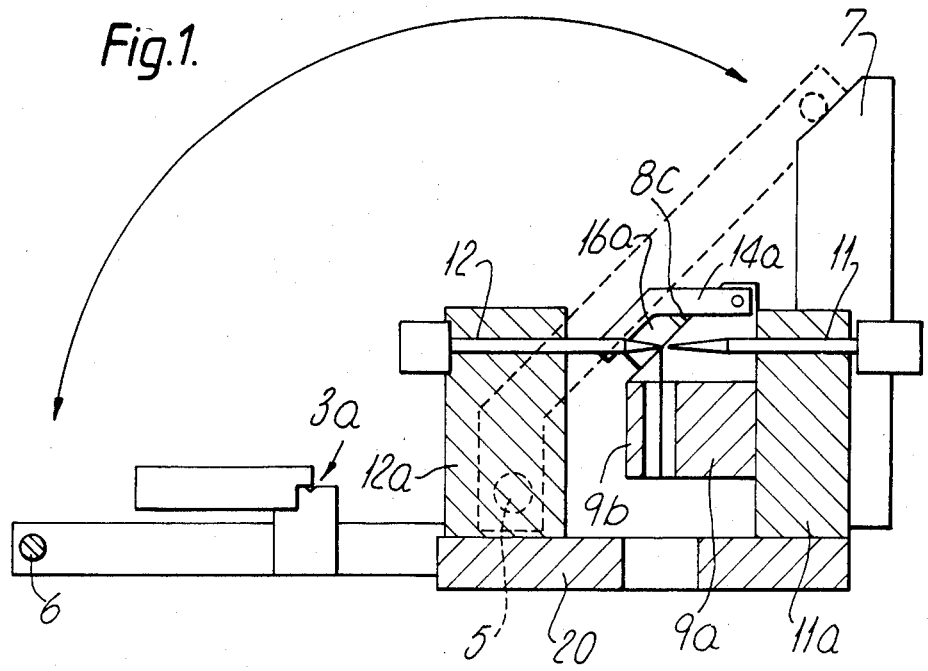
FIG. 1 is a cross section through fibre splicing apparatus according to an embodiment of the invention.

Referring to the Figures a pair of optical fibres 1 and 2 are arranged to have their ends almost touching, facing each other, in carrying arms 3 and 4 which are mounted for rotation about a common axis 5. They are linked by a rigid bar 6 which maintains the arms aligned with one another but allows small axial movement of the arms towards and away from each other.

Each arm carries a clamp 3a and 4a which clamps the fibres 1 and 2 by their respective secondary coatings or jackets 1a and 2a.

The arms are then swung up and over with the fibres until the bar 6 rests on the bar rest 7 (broken line) so that the fibre ends lie in a two-part V-groove 8 in the two-part fibre V-location block 9. This is shown on a larger scale in FIG. 1a and comprises first and second blocks 9a and 9b secured together and defining the V-grooves 8a and 8b. The blocks have a channel 10 accommodating first and second electrodes 11 and 12 for fusing the fibre ends together.

The blocks provide two portions 13a and 13b on either side of the channel 10, which provide the grooves 8a and 8b and also provide support for a pair of pivotally-mounted magnetic fibre clamping arms 14a and 14b. These arms pivot about axis 15.

The arms carry pads 16a and 16b of a rubberised magnetic material which are attracted to the metal surfaces of portions 13a and 13b around the V-grooves 8a and 8b and hold the fibres into the two-part V-groove.

When the fibres have been located in the two-part V-groove arms 14a and 14b are lowered so that the magnetic elastic pads gently hold the fibres in the grooves so that they are in precise axial alignment.

The apparatus further comprises fine pitch adjusting screws 17 and 18 which move the carrying arms 3 and 4 independently towards or away from the central plane A-A of the apparatus so that the fibre ends are accordingly moved towards or away from each other and with respect to the fusing electrode tips. In this way the fibre ends can be arranged to just touch each other precisely at the tips of the electrodes.

A current is then passed through the electrode to heat the glass and fuse the ends together.

Figure 2:
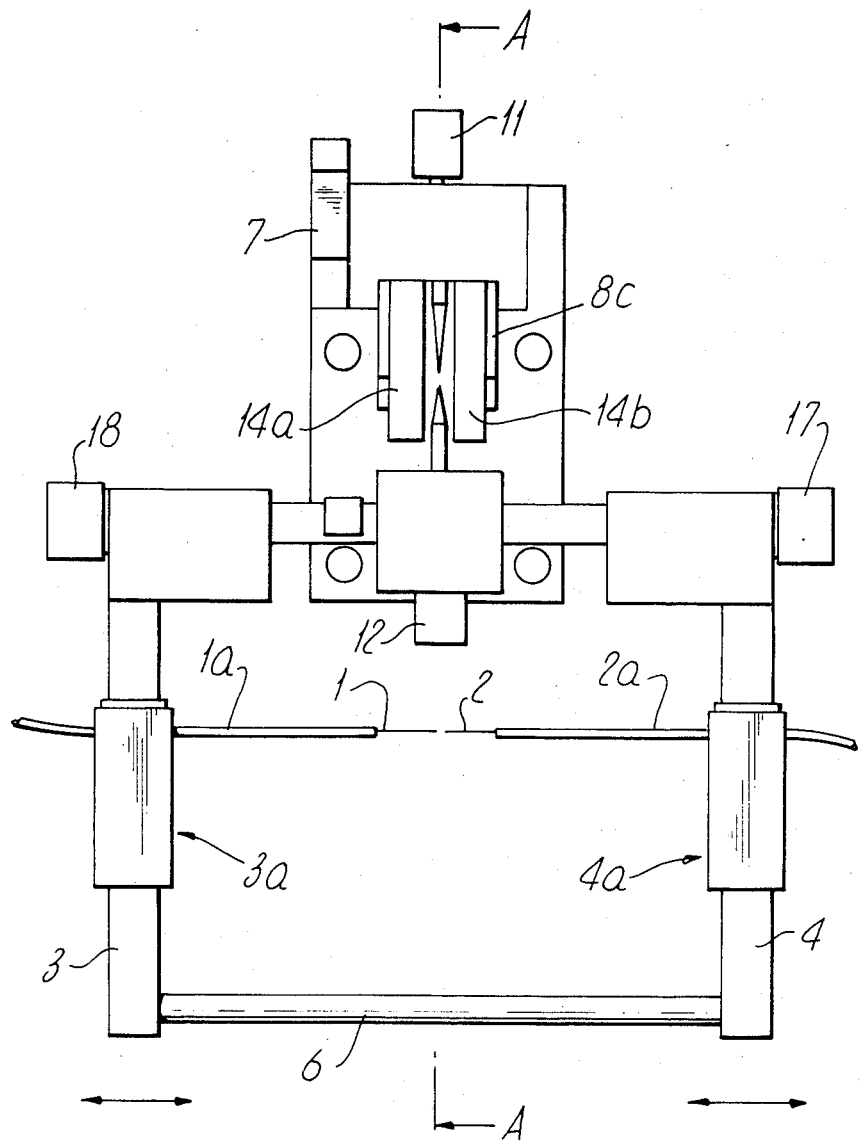
FIG. 2 is a plan view of the embodiment of FIG. 1.

When the fused ends have cooled sufficiently the magnetic clamps are lifted away from the fibres and the carrying arms 3 and 4 are moved back to the open position shown in FIG. 2 which presents the spliced fibres ready for the application of a protective layer over the bared ends 1 and 2, such as two-part epoxy.

The electrodes 11 and 12 are supported in respective supports 11a and 12a fixed to a base plate 20 which is mounted in turn on any convenient base along with the electrical power supply (not shown).

Figure 1A:
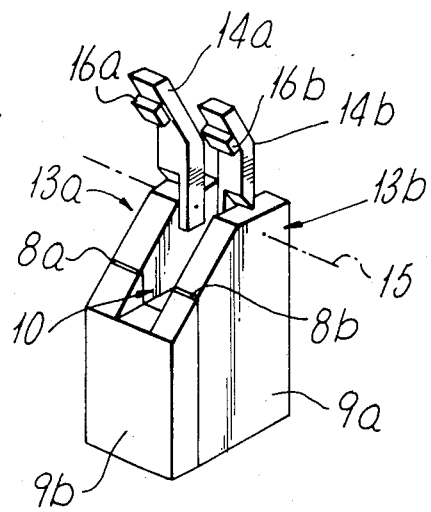
FIG. 1a shows a perspective view of part of FIG. 1.

The V-grooves are designed in this embodiment for a 0.125 O/D–0.50 core fibre, although it is possible to accommodate laser fibres. Preferably the V-grooves have a depth of just 0.50 so that the top surface of the fibre is in line with the plane of the inclined surface 8c (FIG. 1). The rubberised magnetic pads feel like a conventional pencil rubber, to give some idea of their compliance.

The blocks 9a, 9b are made of hardened steel.

What is claimed is:

1. Apparatus for joining the ends of two optical fibres comprising:

first and second spaced apart clamping means having first and second recesses, respectively, which are aligned axially for holding first and second optical fibres, respectively, in said first and second recesses by clamping the protective coatings of said fibres;

third and fourth clamping means positioned between said first and second clamping means and having third and fourth recesses, respectively, which are aligned axially for holding said first and second optical fibres, respectively, in said third and fourth recesses by clamping said fibres;

said first and second clamping means being pivotally mounted for movement about an axis parallel to the aligned axis of said fibres between a first position and a second position in which said four recesses are aligned along a common axis, said first and second clamping means being linked for pivotal movement together, and stop means for limiting the pivotal movement of said first and second clamping means to said second position;

means for moving said first and second optical fibres along said common axis to adjust the relative positions of the ends of said optical fibres which are to be joined; and means located between said third and fourth clamping means for joining together said first and second optical fibres by fusing said ends.

2. Apparatus for joining together the ends of two optical fibres according to claim 1 wherein said coupling means include a bar extending parallel to said common axis and between said first and second clamping means and said fixing means include a bar rest against which said bar rests when said first and second clamping means are in said second position.

3. Apparatus for joining together the ends of two optical fibres according to claim 1 wherein said third and fourth clamping means each include a surface in which one of said recesses for clamping one of said fibres is located and a pivotally mounted arm movable between an open position and a closed position in which said arm extends across said recess.

4. Apparatus for joining together the ends of two optical fibres according to claim 3 wherein said arm carries a rubberised magnetic material which is attracted to said surface.

* * * * *